(12) United States Patent
Zhao

(10) Patent No.: US 9,465,814 B2
(45) Date of Patent: Oct. 11, 2016

(54) ANNOTATING SEARCH RESULTS WITH IMAGES

(75) Inventor: Dan Zhao, Mountain View, CA (US)

(73) Assignee: Google Inc., Mountain View, CA (US)

( * ) Notice: Subject to any disclaimer, the term of this patent is extended or adjusted under 35 U.S.C. 154(b) by 279 days.

(21) Appl. No.: 14/117,197

(22) PCT Filed: May 12, 2011

(86) PCT No.: PCT/CN2011/073976
§ 371 (c)(1),
(2), (4) Date: Nov. 12, 2013

(87) PCT Pub. No.: WO2012/151752
PCT Pub. Date: Nov. 15, 2012

(65) Prior Publication Data
US 2014/0201614 A1    Jul. 17, 2014

(51) Int. Cl.
*G06F 17/30* (2006.01)

(52) U.S. Cl.
CPC ... *G06F 17/30247* (2013.01); *G06F 17/30696* (2013.01); *G06F 17/30864* (2013.01)

(58) Field of Classification Search
CPC ............ G06F 17/30; G06F 17/30247; G06F 17/30696; G06F 17/30864
See application file for complete search history.

(56) References Cited

U.S. PATENT DOCUMENTS

| | | | |
|---|---|---|---|
| 2002/0107847 A1* | 8/2002 | Johnson ............ | G06F 17/30017 |
| 2003/0030679 A1* | 2/2003 | Jain .................. | G06F 17/30884 |
| | | | 715/854 |
| 2008/0288868 A1* | 11/2008 | Lakey ................ | G06F 3/0483 |
| | | | 715/716 |
| 2009/0063455 A1 | 3/2009 | Li et al. | |
| 2011/0047145 A1* | 2/2011 | Ershov ............. | G06F 17/30864 |
| | | | 707/722 |
| 2011/0194726 A1* | 8/2011 | Das Gupta .......... | G06T 1/0021 |
| | | | 382/100 |

FOREIGN PATENT DOCUMENTS

| | | |
|---|---|---|
| CN | 101211341 | 7/2008 |
| WO | WO 01/82129 | 11/2001 |
| WO | WO 0182129 A1 * | 11/2001 ............. G06F 17/30 |

OTHER PUBLICATIONS

Whirlpool.net, Oct. 15, 2006, http://forums.whirlpool.net.au/archive/608638, all pages.*
International Search Report and Written Opinion in International Application No. PCT/CN2011/073976, mailed Feb. 16, 2012, 10 pages.

* cited by examiner

*Primary Examiner* — Cesar Paula
*Assistant Examiner* — Benjamin Norris
(74) *Attorney, Agent, or Firm* — Fish & Richardson P.C.

(57) ABSTRACT

Methods, systems, and apparatus, including computer programs encoded on a computer storage medium, for annotating search results. Images associated with a plurality of different websites are obtained and associated with respective domains of the websites. Search results are then annotated with the obtained images according to their domains. User selection of an annotated search result's image will cause a local search of the website associated with the image based on the query.

21 Claims, 4 Drawing Sheets

ANNOTATING SEARCH RESULTS WITH IMAGES

CROSS-REFERENCE TO RELATED APPLICATION

This application is a National Stage Application under 35 U.S.C. §371 and claims the benefit of International Application No. PCT/CN2011/073976, filed May 12, 2011. The disclosure of the foregoing application is hereby incorporated by reference in its entirety.

FIELD OF THE INVENTION

This invention relates to digital data processing and, in particular, to annotating search results with images.

BACKGROUND OF THE INVENTION

With the expansion of information available on the world wide web, searching the web has become an important way for many users to locate desired information and knowledge. Some search engines present users with search results that include selectable links that can take users to particular Uniform Resource Locators (URLs) for more detailed information. Search results are typically ranked according to their relevance to the search query as determined by the search engine.

SUMMARY OF THE INVENTION

In general, one innovative aspect of the subject matter described in this specification can be embodied in methods that include the actions of: obtaining an image associated with each of a plurality of different websites and associating each obtained image with a domain of the respective website; receiving a plurality of search results responsive to a query, each search result referring to a corresponding web page; for one or more of the search results, annotating the search result with an obtained image associated with a domain of the search result's corresponding web page; and providing the search results including the annotated search results wherein user selection of an annotated search result's image will cause a local search of the website associated with the image based on the query. Other implementations of this aspect include corresponding systems, apparatus, and computer programs, configured to perform the actions of the methods, encoded on computer storage devices.

These and other implementations can each optionally include one or more of the following features. Obtaining an image associated with each of a plurality of different websites can further comprise determining that a website in the plurality of different websites is on a list of predetermined websites; and obtaining the image in response to the determination. The list of predetermined websites can consist of those websites under the control of an entity that provides the plurality of search results responsive to a query. Obtaining an image can further comprise checking a specific location in a directory tree of a website for a file with a designated name; and sending a copy of the file to a server for storage. The specific location can be a root directory of the website. Obtaining an image associated with each of the plurality of websites can further comprise altering the image. Altering the image can include removing a border from the image. Altering the image can include resizing the image. The provided annotated search results can be presented with their respective images. User selection of the annotated search result's image can cause a page that presents the provided search results to expand by including an area within the page for presenting results from the local search.

Particular implementations of the subject matter described in this specification can be implemented so as to realize one or more of the following advantages. Users can easily discern whether a search result is relevant to their query based on an image presented with the search result. A local search of a website associated with a search result can be accomplished by selection of the image presented with the search result.

Further implementations, features, and advantages of the invention, as well as the structure and operation of the various implementations of the invention are described in detail below with reference to accompanying drawings.

BRIEF DESCRIPTION OF THE DRAWINGS

Like reference symbols in the various drawings indicate like elements.

DETAILED DESCRIPTION OF THE INVENTION

The present disclosure relates to annotating search results with images indicating the source of each search result. In various implementations, the image is a 16×16 or 32×32 pixel square icon associated with a particular website or webpage. Other image sizes are possible. The image can be stored in a file located in the root directory of a website, for example. However, it can also reside in other places and be referenced in the header section of an HTML page, for instance, so that a web browser will know where to look for it. In some implementations, the image is in a file named "favicon.ico".

Users who are familiar with the image of a particular website will easily recognize that the search result is from that website. For example, the image could be a reduced in size rendering of the website's home page for the particular website that is referred to by the search result. By way of further illustration, the image could be a company logo or trademark associated with a company that owns the website. Such an image could be extracted from one of the website's web pages or retrieved from a database of such images using the website URL or company name as a key, for instance.

In various implementations, the images are user-selectable. That is, user selection of an image (e.g., by "clicking" a mouse button or by touching a display device) initiates an action. In some implementations, the action is performed by a search within the domain of the website associated with the selected image. Other actions are possible.

Figure 1:
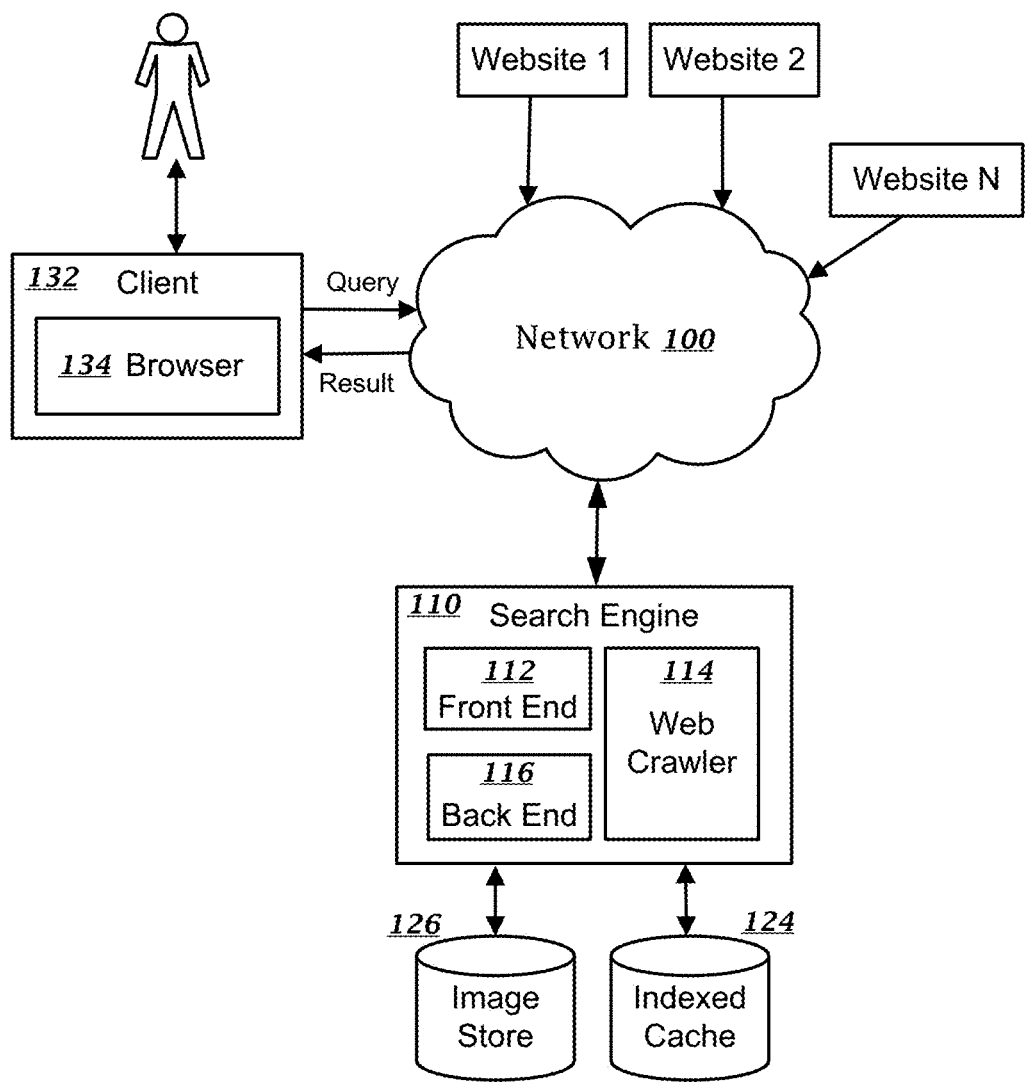
FIG. 1 is a schematic overview of an example system for annotating search results with images.

FIG. 1 is a schematic overview of an example system for annotating search results with images of related websites. Websites 1-N are connected to a network 110 (e.g., the Internet). Each website is associated with a respective domain name. A search engine 110 is connected to the network 100 and crawls the web for information in the web pages of the various websites 1-N. The crawled data is indexed and stored in an indexed cache 124 for later usage in extracting relevant search results in response to a search query from a user. An image store 126 for storing images of various websites and the association between each image and the website is also connected with the search engine 110. In one implementation, the image store 126 can be a data table within the indexed cache for easy access. The search engine 110 also contains a front end 112 and a back end 116, which are configured to serve search requests from clients, such as a browser 134 at a client 132. In serving a search request from a client 132, both the indexed cache 124 and the image store 126 can be accessed to retrieve search results and the associated images, and return annotated search results.

Figure 2:
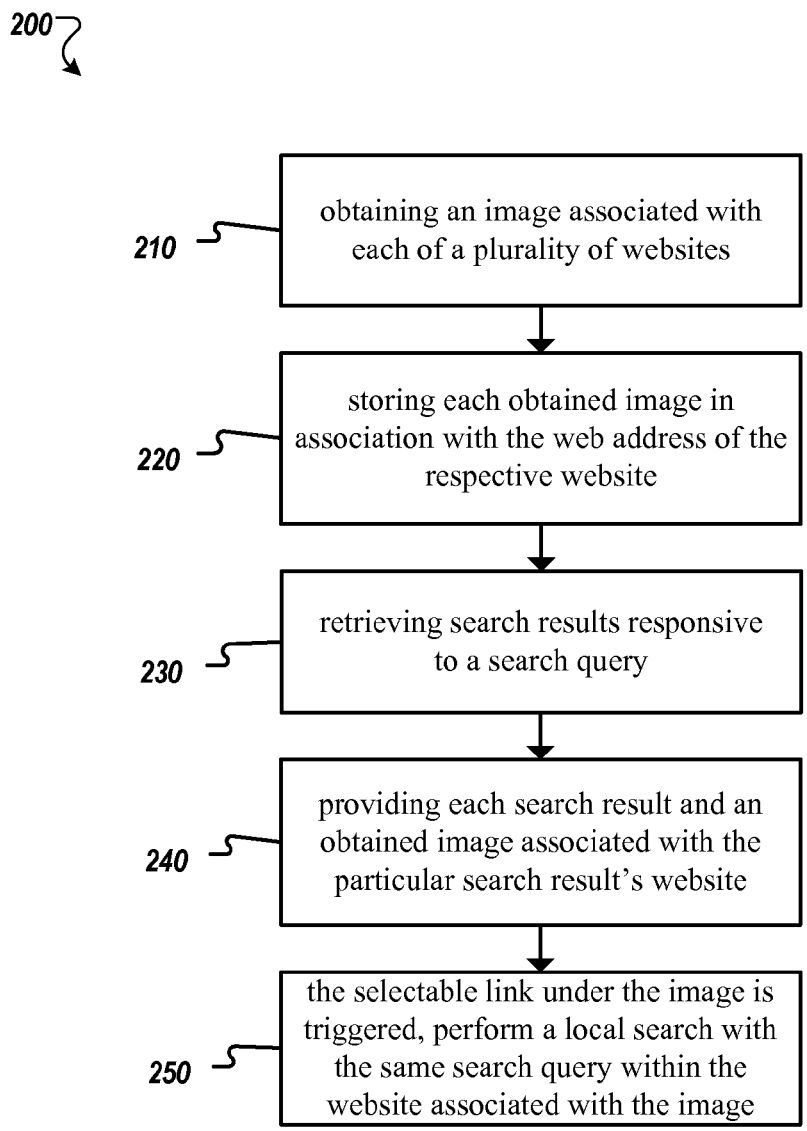
FIG. 2 is a flow chart of an example technique for annotating search results.

FIG. 2 is a flow chart of an example technique for annotating search results. At step 210, a web crawler 114 or another process crawls the web and indexes each web page crawled and stored in the index cache 124. The web crawler 114 has an additional function of checking each website it visited for an image. It may check the root directory of that website for a file containing the image. If the file exists, the web crawler 114 makes a copy of the image file and sends it back to the search engine for storage in the image store 126 in association with the URL of the website to which this image is from (step 220). In another implementation, the web crawler 114 can also check the home page of the website for a particular location where an image file could reside. For example, the web crawler 114 can check in the root directory of the website for the existence of a web page titled "index.html", "default.html", "index.aspx", "default.aspx", "index.jsp", or "default.jsp", etc., and if such a web page exists, check in the header section of this HTML page or generated HTML page to determine whether it contains HTML tags in a form like: <link rel="icon" href="/path/file name" type="image/x-icon"> <link rel="shortcut icon" href="/path/file name" type="image/x-icon">. If so, the web crawler follows the link in the attribute "href" to extract a copy of the file located at path/file name and then sends it back to the search engine 110 (or to another process) for storage in the image store 126, together with the URL of the website it is associated with. If a website does not have an image file, the web crawler 114 can simply skip this website. In some implementations, the web crawler 114 will only store those images associated with a predetermined list (e.g., a list of those websites operated by the same entity that operates the search engine). An image processing module (not shown) may also be installed at the search engine 110 to process the obtained images of the websites. For example, if the obtained image file is of a size of 32*32 pixels, the image processing module can resize this image to 16*16 pixels and save this scaled image in image store 126. In some situations, the obtained image may have a border frame of some dark color. In this case, the image processing module can be configured to automatically detect such border frames and remove them before they are saved into the image store 126.

At step 230, a user at a client 132 submits a search request to the search engine 110 through a browser 134 executing on the client 132. For example a query "mobile" is submitted to the search engine webpage located at URL "http://www.google.com". Upon receiving the search query, the front end 112 of the search engine 110 parses the query and forwards it to the back end 116 of the search engine 110 to retrieve search results responsive to the query. By way of illustration, a search result can refer to a web page that contain the query term "mobile" as indicated by an entry in the indexed cache 124. In some implementations, a search result can include a snippet of text extracted from the webpage referred to by the search result. In other implementations, a search result does not include a snippet of text.

The back end 116 performs, at step 240, a lookup in the image store 126 for the image associated with each of the web pages in the search results. This is achieved by checking the URL of each of the resulting web pages and using just the domain name in the URL as a key to look up in the image store 126 for its corresponding image file. For example, the URL of one of the search results is "http://www.google.com/mobile/"; the back end 116 will parse this URL to obtain the domain name "www.google.com" and use this domain name as the key to find a corresponding image for this website in the image store 126. The obtained search results and the corresponding image files will be sent to the front end 112 for providing to the requesting client. It is possible that some search results do not have associated images in the image store 126. In this case, the front end 112 can use a default image to present to the user together with the search result.

Figure 3:
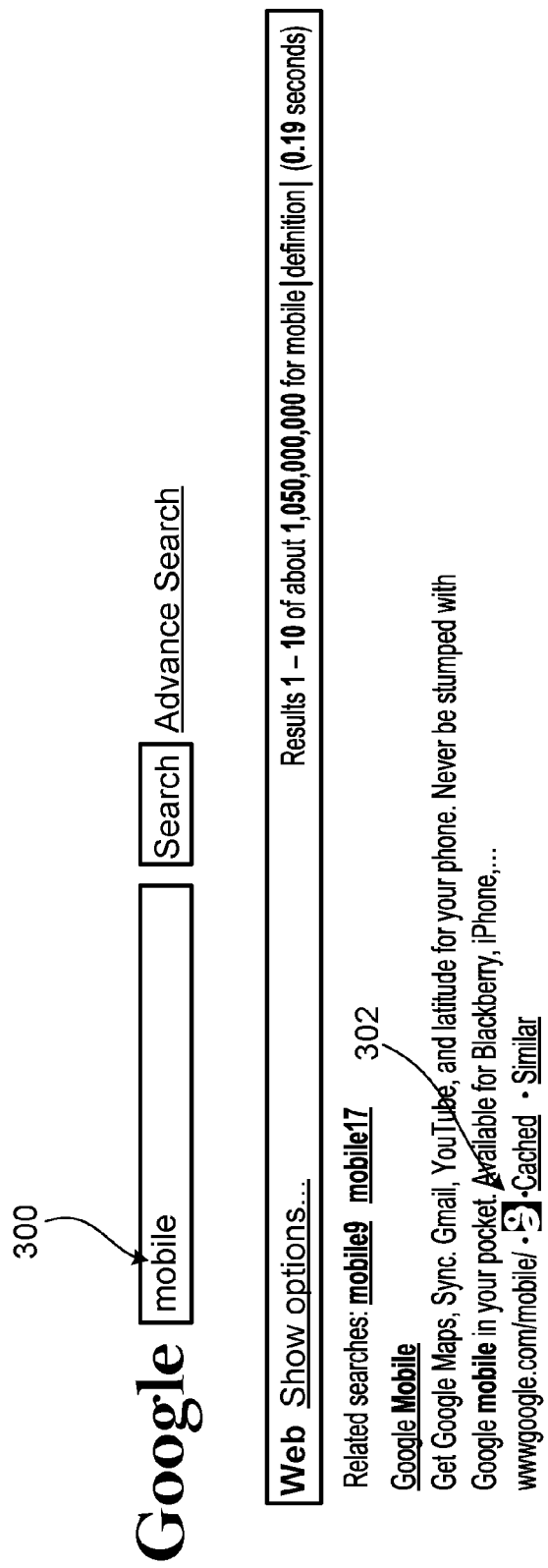
FIG. 3 illustrates example annotated search results.

The image associated with the domain name of each search result can be displayed along with the particular URL of the web page to which the search result refers. FIG. 3 is an example search result page showing a search result for the query "mobile" 300 together with its associated image. In FIG. 3, the icon 302 is the image that is obtained from the websites from which the search results is obtained. The icon 302 can be further implemented with a selectable link that, when selected, performs a local search within the domain of the particular website of a search result and returns to the user search results only from that website (step 250). This is particularly useful when the user further wants to know search results only from a particular website. It eliminates the need of having to type in the search field the query of "mobile site:www.google.com", for example. For many users who are unfamiliar with the query syntax of each search engine, they may not even know how to perform a search within the domain of a particular website. For these people, this visual representation of a website in a search result not only helps them quickly identify the important websites they may have already been familiar with in the bookmark section or the address bar of a browser, but also helps them easily find any additional search results of their submitted search query from a particular website that may be of most interest to them.

Figure 4:
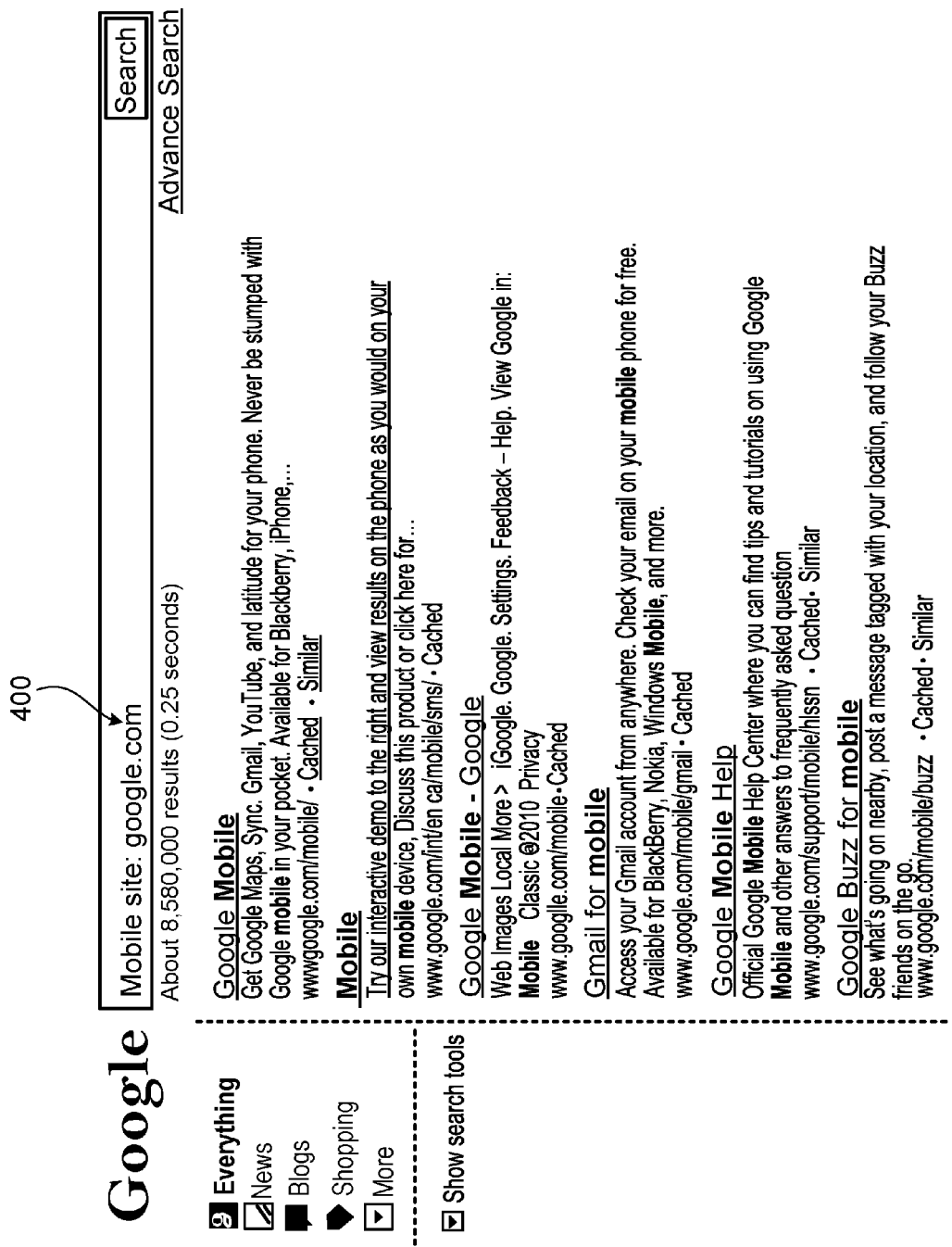
FIG. 4 illustrates example search results from the domain of a website.

FIG. 4 is one example of the search results after performing a local search within the domain www.google.com for the same query "mobile". It can be seen that the input field contains a query string "mobile site:google.com" 400, which is actually filled in by clicking on the icon 302 in FIG. 3. This query of local search is sent to the search engine to obtain the set of search results only within the domain "www.google.com". In some implementations, the page of the local search results in FIG. 4 is displayed by overwriting the previous page of search results as shown in FIG. 3 in the same pane of a browser. In some other implementations, the page of local search results within the particular website the user is interested in can also be a popup window, another pane under a separate tab, or just a sub-pane within the page of search results as shown in FIG. 3, which can be realized by employing the asynchronous techniques provided by asynchronous JavaScript and XML, for example.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   indexing by a search engine each of a plurality of different websites, the indexing for a particular website comprising:
   determining that the particular website is on a list of predetermined websites that identifies websites that are each operated by an entity that provides a plurality of search results responsive to a query;
   obtaining an image associated with the particular website, the particular website having a domain name in response to determining that the particular website is on the list of predetermined websites that are each operated by an entity that provides the plurality of search results responsive to a query; and
   associating the obtained image with the domain name of the particular website;
   storing by the search engine each association of domain name with obtained image;
   receiving a plurality of search results responsive to a query submitted to the search engine, each search result referring to a corresponding web page for a website operated by the entity;
   for one or more of the search results:
   identifying by the search engine from the stored associations an image that is associated with a domain name of the corresponding webpage of the search result; and
   annotating by the search engine the search result with the identified image, the identified image in the annotated search result being implemented as a link that, when selected, requests the search engine to perform a local search within a domain defined by the domain name of the corresponding web page;
   providing the plurality of search results including the one or more annotated search results in a response to the query for presentation in a page;
   receiving selection of an annotated search result's image;
   determining local search results for the domain associated with the selected image; and
   providing the local search results for presentation in the page, the local search results presented in the page with at least some of the plurality of search results by expanding the page to include an area within the page for presenting the local search results.

2. The method of claim 1 wherein obtaining the image associated with the particular website further comprises:
   checking a specific location in a directory tree of the particular website for a file with a designated name; and
   sending a copy of the file to a server for storage.

3. The method of claim 2 wherein the specific location is a root directory of the particular website.

4. The method of claim 2 wherein obtaining the image associated with the particular website further comprises altering the image.

5. The method of claim 4 wherein altering the image includes removing a border from the image.

6. The method of claim 4 wherein altering the image includes resizing the image.

7. A non-transitory computer storage medium having instructions stored thereon that, when executed by data processing apparatus, cause the data processing apparatus to perform operations comprising:
   indexing by a search engine each of a plurality of different websites, the indexing for a particular website comprising:
   determining that the particular website is on a list of predetermined websites that identifies websites that are each operated by an entity that provides a plurality of search results responsive to a query;
   obtaining an image associated with the particular website, the particular website having a domain name in response to determining that the particular website is on the list of predetermined websites that are each operated by an entity that provides the plurality of search results responsive to a query; and
   associating the obtained image with the domain name of the particular website;
   storing by the search engine each association of domain name with obtained image;
   receiving a plurality of search results responsive to a query submitted to the search engine, each search result referring to a corresponding web page for a website operated by the entity;

for one or more of the search results:
  identifying by the search engine from the stored associations an image that is associated with a domain name of the corresponding webpage of the search result; and
  annotating by the search engine the search result with the identified image, the identified image in the annotated search result being implemented as a link that, when selected, requests the search engine to perform a local search within a domain defined by the domain name of the corresponding web page;
  providing the plurality of search results including the one or more annotated search results in a response to the query for presentation in a page;
  receiving selection of an annotated search result's image;
  determining local search results for the domain associated with the selected image; and
  providing the local search results for presentation in the page, the local search results presented in the page with at least some of the plurality of search results by expanding the page to include an area within the page for presenting the local search results.

8. The storage medium of claim 7 wherein obtaining the image associated with the particular website further comprises:
  checking a specific location in a directory tree of the particular website for a file with a designated name; and
  sending a copy of the file to a server for storage.

9. The storage medium of claim 8 wherein the specific location is a root directory of the particular website.

10. The storage medium of claim 8 wherein obtaining the image associated with the particular website further comprises altering the image.

11. The storage medium of claim 10 wherein altering the image includes removing a border from the image.

12. The storage medium of claim 10 wherein altering the image includes resizing the image.

13. A system comprising:
  a computer storage medium having instructions stored thereon; and
  data processing apparatus coupled to the storage medium and operable to execute the instructions to perform operations comprising:
    indexing by a search engine each of a plurality of different websites, the indexing for a particular website comprising:
      determining that the particular website is on a list of predetermined websites that identifies websites that are each operated by an entity that provides a plurality of search results responsive to a query;
      obtaining an image associated the particular website, the particular website having a domain name in response to determining that the particular website is on the list of predetermined websites that are each operated by an entity that provides the plurality of search results responsive to a query; and
      associating the obtained image with the domain name of the particular website;
    receiving a plurality of search results responsive to a query submitted to the search engine, each search result referring to a corresponding web page for a website operated by the entity;
    for one or more of the search results:
      identifying by the search engine from the stored associations an image that is associated with a domain name of the corresponding webpage of the search result; and
      annotating by the search engine the search result with the identified image, the identified image in the annotated search result being implemented as a link that, when selected, requests the search engine to perform a local search within a domain defined by the domain name of the corresponding web page;
    providing the plurality of search results including the one or more annotated search results in a response to the query for presentation in a page;
    receiving selection of an annotated search result's image;
    determining local search results for the domain associated with the selected image; and
    providing the local search results for presentation in the page, the local search results presented in the page with at least some of the plurality of search results by expanding the page to include an area within the page for presenting the local search results.

14. The system of claim 13 wherein obtaining the image associated with a particular website further comprises:
  checking a specific location in a directory tree of the particular website for a file with a designated name; and
  sending a copy of the file to a server for storage.

15. The system of claim 14 wherein the specific location is a root directory of the particular website.

16. The system of claim 14 wherein obtaining the image associated with the particular website further comprises altering the image.

17. The system of claim 16 wherein altering the image includes removing a border from the image.

18. The system of claim 16 wherein altering the image includes resizing the image.

19. The method of claim 1 wherein determining that the particular website is on the list of predetermined websites comprises determining that content of the particular website is hosted on one or more servers maintained by an entity that provides the plurality of search results responsive to a query.

20. The storage medium of claim 7 wherein determining that the particular website is on the list of predetermined websites comprises determining that content of the particular website is hosted on one or more servers maintained by an entity that provides the plurality of search results responsive to a query.

21. The system of claim 13 wherein determining that the particular website is on the list of predetermined websites comprises determining that content of the particular website is hosted on one or more servers maintained by an entity that provides the plurality of search results responsive to a query.

* * * * *